United States Patent
Kasai et al.

(10) Patent No.: US 6,986,065 B2
(45) Date of Patent: Jan. 10, 2006

(54) DISTRIBUTION RESULT VERIFICATION METHOD FOR INFORMATION DISTRIBUTION SYSTEM

(75) Inventors: Norimitsu Kasai, Chiyoda-ku (JP); Tomoko Okumoto, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 898 days.

(21) Appl. No.: 09/883,954

(22) Filed: Jun. 20, 2001

(65) Prior Publication Data

US 2001/0046297 A1 Nov. 29, 2001

(51) Int. Cl.
*H04L 12/26* (2006.01)

(52) U.S. Cl. .................................. 713/301; 370/394
(58) Field of Classification Search ................. 370/310, 370/336–337, 394; 709/232–237
See application file for complete search history.

(56) References Cited

U.S. PATENT DOCUMENTS 5,568,476 A * 10/1996 Sherer et al. ............... 370/236
5,784,559 A * 7/1998 Frazier et al. .............. 370/522

FOREIGN PATENT DOCUMENTS

| JP | 6-021923 | 1/1994 |
| JP | 6-224863 | 8/1994 |
| JP | 10-023014 | 1/1998 |

OTHER PUBLICATIONS

IPSJ SIG Notes, vol. 96, No. 12, pp. 209 214, "A Broadcast Protocol for Satellite Channels", Jan. 26, 1996 (with partial English translation).

* cited by examiner

*Primary Examiner*—Gregory Morse
*Assistant Examiner*—Thomas Ho
(74) *Attorney, Agent, or Firm*—Oblon, Spivak, McClelland, Maier & Neustadt, P.C.

(57) ABSTRACT

A sender station sends a verification signal to itself after having sent data to be distributed. In the event that any one of receiver stations has failed to receive any one of data sets, the receiver station sends a predetermined jamming signal, to thereby hinder the sender station from receiving the verification signal transmitted to the sender station. When having failed to receive the verification signal, the sender station determines that any one of the receiver stations has failed to receive the data. In contrast, when having received the verification signal, the sender station determines that all the receiver stations have successfully received the data.

5 Claims, 4 Drawing Sheets

DISTRIBUTION RESULT VERIFICATION METHOD FOR INFORMATION DISTRIBUTION SYSTEM

BACKGROUND OF THE INVENTION

1. Field of the Invention

The present invention relates to a distribution result verification method for use in an information distribution system. More particularly, the present invention relates to a distribution result verification method suitable for use with a system which distributes a large volume of information to a plurality of receiving stations, as in the case of a system which distributes motion pictures by way of a communications satellite.

2. Background Art

In a communications system requiring a high degree of reliability, in the event of a communications error, a sender station must re-send the data which a receiving station has failed to receive. To this end, in such a communications system, a receiver station sends, in reply to the sender station, a response signal indicating whether or not data have been successfully received. The sender station can detect occurrence of a communications error by means of presence/absence of the response signal or from contents of the response signal.

When data are simultaneously distributed to a plurality of receiver stations as in the case of a motion picture distribution service, the sender station must check whether or not all the receiver stations have received the data. In the case of data of great size such as data pertaining to motion pictures, the data are transmitted while being divided into unit data sets of appropriate sizes. Therefore, the sender station must check successful receipt of data on a per-unit-data-set basis. FIG. 4 shows a processing sequence employed in sending data on a per-unit-data-set basis. A sender station 1 simultaneously sends a unit data set to individual receiver stations 2. Subsequently, the sender station 1 sends, to the respective receiver stations 2 on an individual basis, an inquiry signal 7 for inquiring the result of data distribution. In response to the inquiry signal 7, each of the receiver stations 2 sends a response signal 8 indicating the result of receipt of data. By means of the sender station 1 making inquiries of the receiver stations individually, congestion of the response signals 8 at the sender station 1 can be decreased. In the illustrated example, receiver stations $2_1$ and $2_2$ have successfully received a unit data set 4, whereas a receiver station $2_N$ has failed to receive the unit data set 4. In this case, the receiver stations $2_1$ and $2_2$ return, as the response signals 8, ACK signals indicating successful receipt of the unit data set 4. The receiver station $2_N$ returns, as the response signal 8, a NACK signal indicating unsuccessful receipt of the unit data set 4. Similar processing is iterated on a per-unit-data-set basis. According to this method, the greater the number of receiver stations or the greater the size of data to be distributed, the longer a time required for checking the result of data distribution. This imposes great burden on processing performance of the sender station, thus hindering timely distribution of data. A method of solving this problem is described in Japanese Patent Application Laid-Open No.296122/1992. According to this method, a relay station sends, to the transmission station and as a single result, distribution results pertaining to several receiver stations. In a video communications system described in Japanese Patent Application Laid-Open No. 224863/1994, the sender station has sent, to receiver stations beforehand, a schedule of programs to be distributed. Receiver stations check received data against the program schedule, thus detecting occurrence of receipt failures. The only requirement is that the sender station transmits data again only when a re-transmission request is issued from a receiver station that has detected a receipt failure. Hence, the sender station does not perform any processing for checking distribution results. The preceding method shortens a time required for checking distribution results as compared with the related-art method. However, processing time of and a burden imposed on the sender station increase in proportion to the number of receiver stations and the size of data to be distributed. The latter method is susceptible to restrictions; that is, there is a necessity of distributing a program schedule to a receiver station beforehand. For this reason, the method is not suitable for use in an information distribution service for which a schedule has not been determined.

SUMMARY OF THE INVENTION

The present invention provides a method of efficiently verifying a result of distribution effected by an information distribution system without regard to the number of receiver stations. First, a sender station sends information to be distributed to receiver stations while the information is divided into a plurality of unit data sets. Next, the sender station sends, to the sender station itself, a plurality of verification signals corresponding to the respective unit data sets. Further, the sender station receives the thus-transmitted verification signals. In the event that a certain receiver station has failed to receive any unit data set, the receiver station sends a predetermined jamming signal to the sender station. The jamming signal is transmitted in synchronism with a verification signal, from among verification signals to be transmitted from the sender station, which corresponds to a unit data set which the receiver station has failed to receive. Transmission of the jamming signal equal in frequency with the verification signal hinders the sender station from receiving the verification signal that the sender station has transmitted to itself. If the sender station fails to receive the verification signal as a result of the jamming signal output from the receiver station, the sender station determines that distribution of the unit data set corresponding to the verification signal has failed. In contrast, if the sender station was able to receive the verification signal normally, the sender station determines that all the receiver stations have successfully received the unit data sets.

DETAILED DESCRIPTION OF THE PREFERRED EMBODIMENTS

First Embodiment

Figure 1:
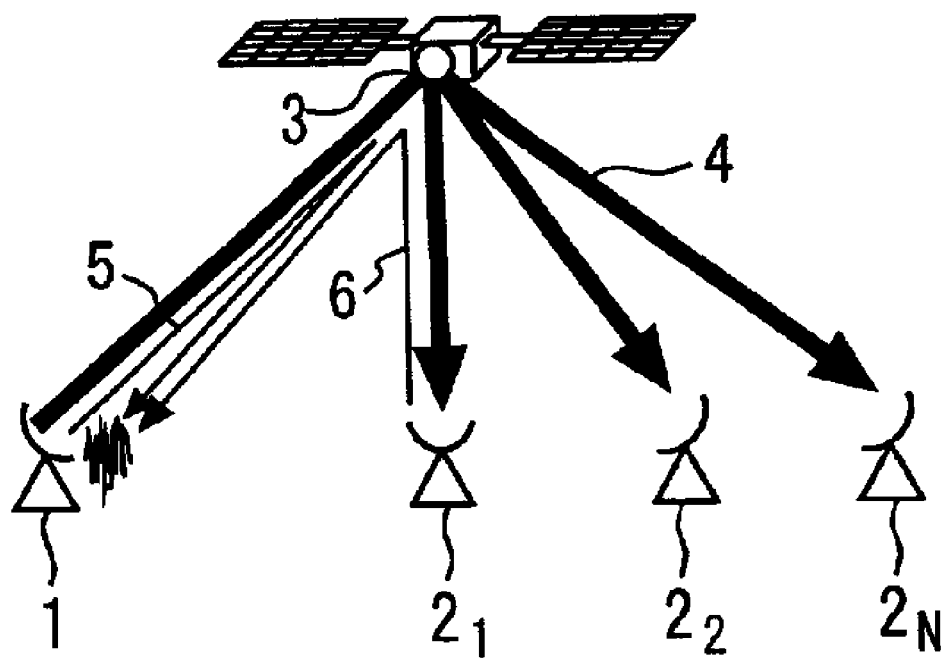
FIG. 1 is an illustration showing configuration of a satellite communications system and flow of signals according to a first embodiment of the present invention.

FIG. 1 is an illustration showing the outline of a satellite communications system according to a first embodiment of the present invention. The system comprises a sender station 1 for distributing a variety of types of data such as video data and sound data; and a plurality of receiver stations 2 for receiving the data. Data 4 are transferred to the receiver stations 2 by way of a satellite 3.

The sender station 1 distributes the data 4 to individual receiver stations 2. Preferably, the data 4 are distributed by means of multicast distribution. Alternatively, the data 4 may be distributed by means of broadcast distribution. After having distributed the data 4, the sender station 1 sends a predetermined verification signal 5 to itself (i.e., the sender station 1). A time at which the verification signal 5 is to be transmitted is set beforehand as, e.g., several seconds after transmission of the data 4. In the event that any one of the receiver stations 2 has failed to receive the data 4, the receiver station 2 sends, to the sender station 1, a jamming signal 6 which is identical in frequency with the verification signal 5. The jamming signal 6 is intended for hindering the sender station 1 from receiving the verification signal 5. Hence, contents of the jamming signal 6 may be set arbitrarily. Upon receipt of the jamming signal 6 from any one of the receiver stations 2, the sender station 1 cannot receive the verification signal 5 and hence can ascertain occurrence of a distribution failure. In contrast, when the sender station 1 has been able to receive the verification signals 5, no receiver stations 2 have transmitted the jamming signal 6. Hence, the sender station 1 can ascertain successful distribution of data 4.

Figure 2:
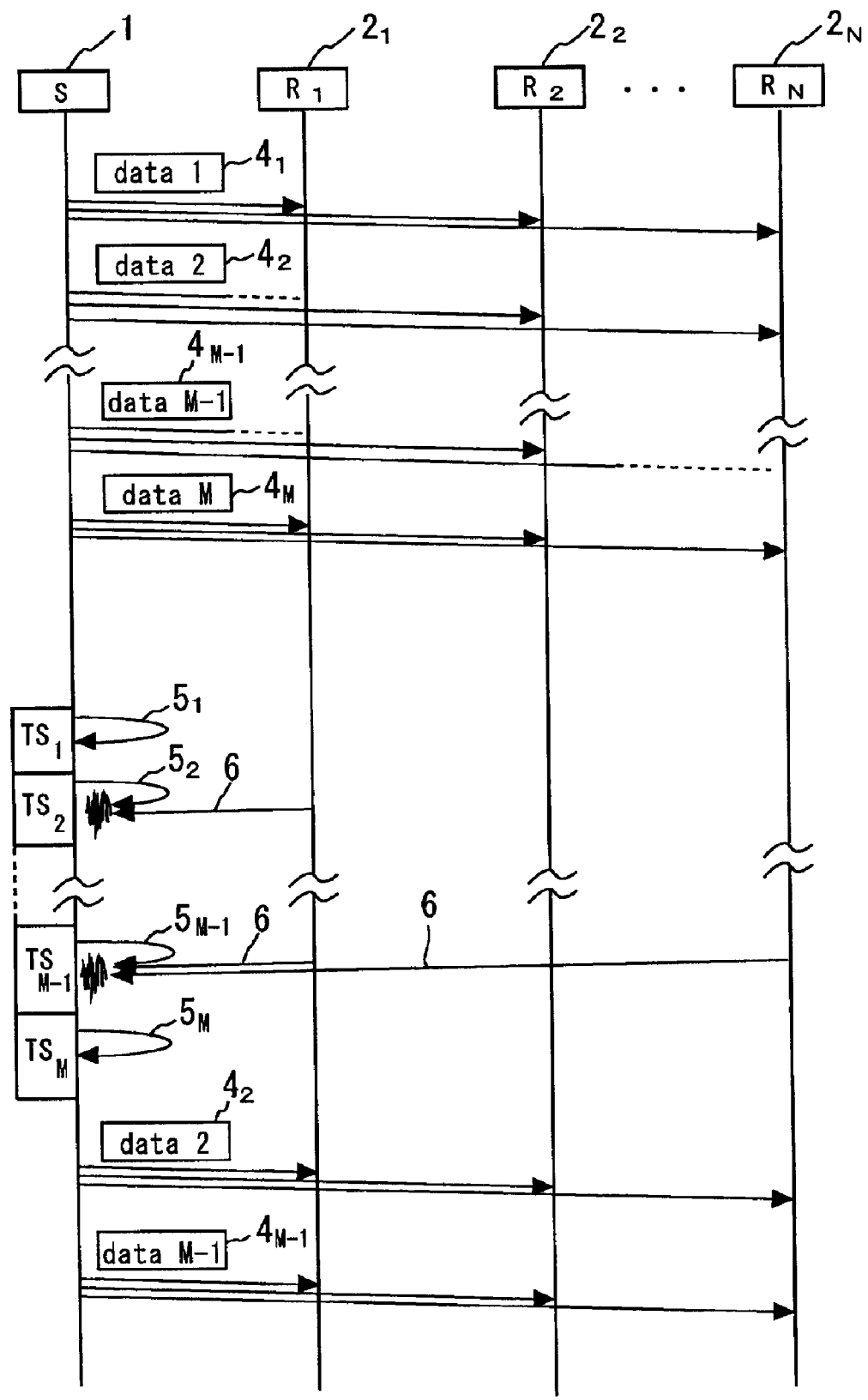
FIG. 2 is an illustration showing a processing sequence according to the first embodiment.

FIG. 2 shows a processing sequence described previously. The sender station 1 transmits the information to be distributed to the receiver stations $2_1$ through $2_N$ while the data 4 are divided into a plurality of unit data sets $4_1$ through $4_M$. The illustration shows that the sender station 1 distributes M unit data sets $4_1$ through $4_M$ to the receiver stations $2_1$ through $2_N$. The individual receiver stations 2 receive the unit data sets 4 transmitted from the sender station 1. In the event that any of the receiver stations 2 has failed to receive some unit data sets 4, a list of unsuccessfully-received data is prepared and recorded as, e.g., a list of ordinal numbers assigned to the unsuccessfully-received unit data sets. The illustration shows that the receiver station $2_1$ has failed to receive a second unit data set $4_2$ and an M-1 unit data set $4_{m-1}$, from among M unit data sets transmitted from the sender station 1. Further, the illustration shows that the receiver station $2_N$ has failed to receive a unit data set $4_{m-1}$ transmitted at M-1.

After having finished transmitting M unit data sets $4_1$ through $4_M$, the sender station 1 sends to itself M verification signals $5_1$ through $5_M$. The verification signals $5_1$ through $5_M$ are time-division signals allocated respectively to M time slots. The time slots correspond to the respective unit data sets 4. A certain receiver station 2 which has failed to receive any one of the unit data sets 4 sends the jamming signal 6, in synchronism with the verification signal 5 allocated to a time slot corresponding to the unit data set that has been unsuccessfully received. The illustration shows that the receiver station $2_1$, which has failed to receive the second unit data set 4 and the M-1$^{th}$ unit data set 4, sends the jamming signals 6 so as to hinder the sender station 1 from receiving the verification signals 5 allocated to the second and M-1$^{th}$ time slots. Similarly, the receiver station $2_N$, which has failed to receive M-1$^{th}$ unit data set 4, transmits the jamming signal 6 in synchronism with the M-1$^{th}$ time slot.

The sender station 1 receives the verification signals 5 transmitted to itself. As mentioned previously, the verification signals 5 assigned to time slots $TS_2$ and $TS_{M-1}$ cannot be received by the sender station 1 under the influence of the jamming signal 6 transmitted from either the receiver station $2_1$ or $2_N$. The sender station 1 records numbers assigned to the verification signals 5 that the sender station 1 has failed to receive. In contrast, the verification signals 5 assigned to the remaining time slots are not hindered and hence can be received successfully by the sender station 1. At this time, each of the verification signals 5 includes an ordinal number indicating the sequential number of the unit data set 4 corresponding to the verification signal 5. The sender station 1 does not merely receive the verification signal 5 but also identifies, from the contents of the verification signal 5, the nature of a unit data set 4 for which a distribution result is to be checked by means of the verification signal 5. The reason for this is that, even when a verification signal 5 which has been sent previously returns to the sender station 1 later than a subsequent verification signal 5, the distribution result can be checked correctly.

The sender station 1 distributes again, to all the receiver stations 2, the unit data set 4 corresponding to the number of the recorded time slot. The illustration shows re-transmission of the second unit data set 4 which the receiver station $2_1$ has failed to receive, and re-transmission of the M-1$^{th}$ unit data that the receiver stations $2_1$ and $2_N$ have failed to receive. Since each of the receiver stations $2_1$ through $2_N$ has a list of unsuccessfully received unit data sets 4, the list is compared with the re-transmitted data, and the data are received, if necessary. In contrast, if the data have already been received, the thus-re-transmitted data are not received.

As has been described, according to this method, the sender station 1 sends M verification signals 5 to itself and verifies distribution results by receipt of the verification signals 5. Hence, the present method shortens a time required for verifying distribution results as compared with the related-art method in which inquiry signals transmitted from a sender station are received by receiver stations and the receiver stations return the inquiry signals in reply to the sender station. In contrast with the related-art method, the time required for verifying distribution results depends on solely the number of unit data sets distributed and not on the number of receiver stations. Consequently, even when the number of receiver stations increases, the verification time does not become longer. By means of shortening the time required for verifying distribution results, the processing time of the overall system can be shortened. Thus, there can be provided a high-speed, highly-reliable information distribution service.

When a distribution result is verified for each set of unit data sets, the verification signal 5 is constituted of a time-division signal as in the above-described embodiment, thereby enabling efficient verification of distribution results.

Further, the verification signal 5 includes information to be used for differentiating unit data sets, such as ordinal numbers assigned to unit data sets. If an ordinal number included in the verification signal 5 is checked when the sender station 1 has received the verification signal 5, even if the verification signals 5 have returned to the sender station 1 in a transposed sequence, the distribution results can be correctly grasped.

Second Embodiment

Figure 3:
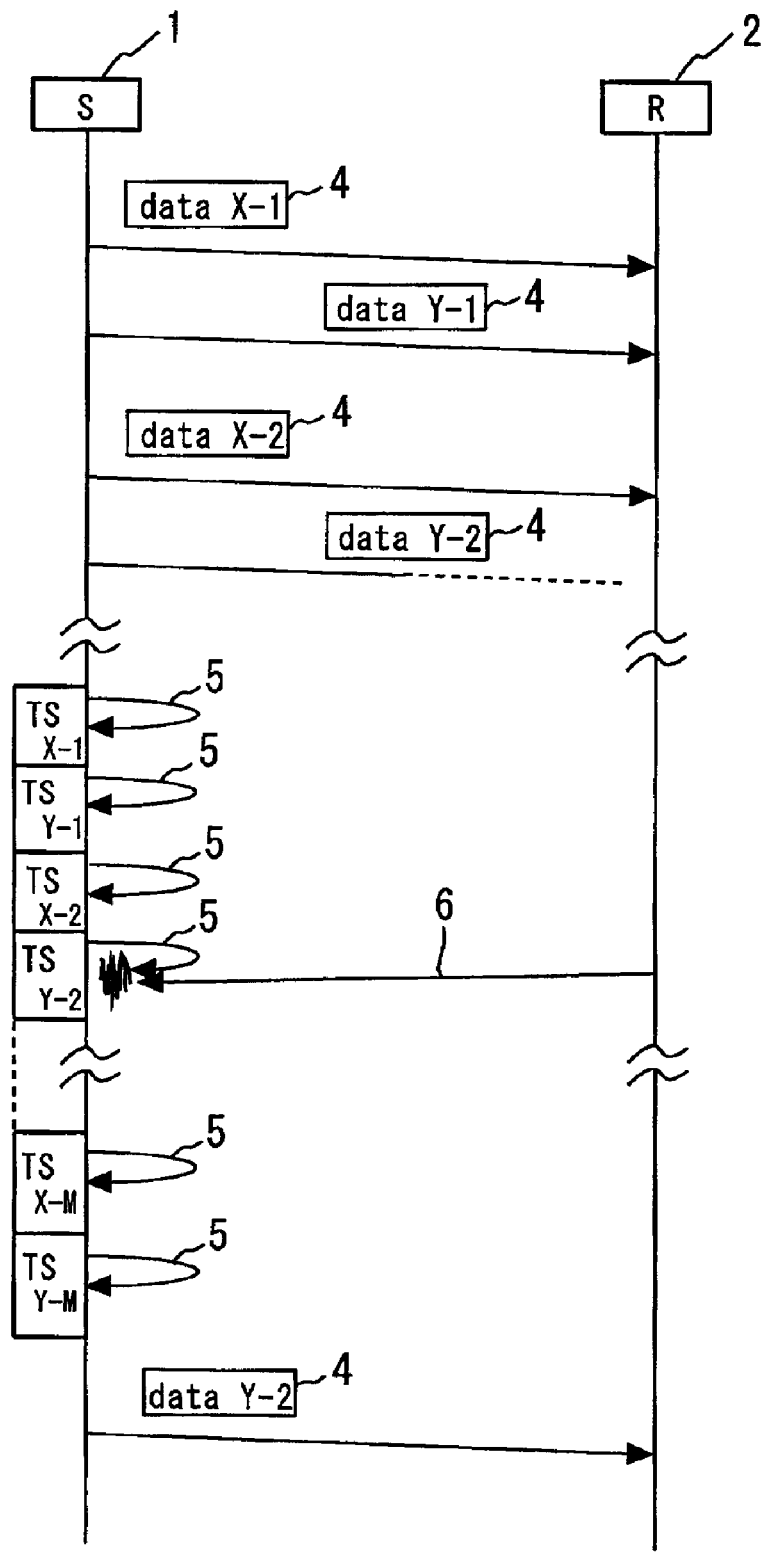
FIG. 3 is an illustration showing a processing sequence according to a second embodiment of the present invention.
Figure 4:
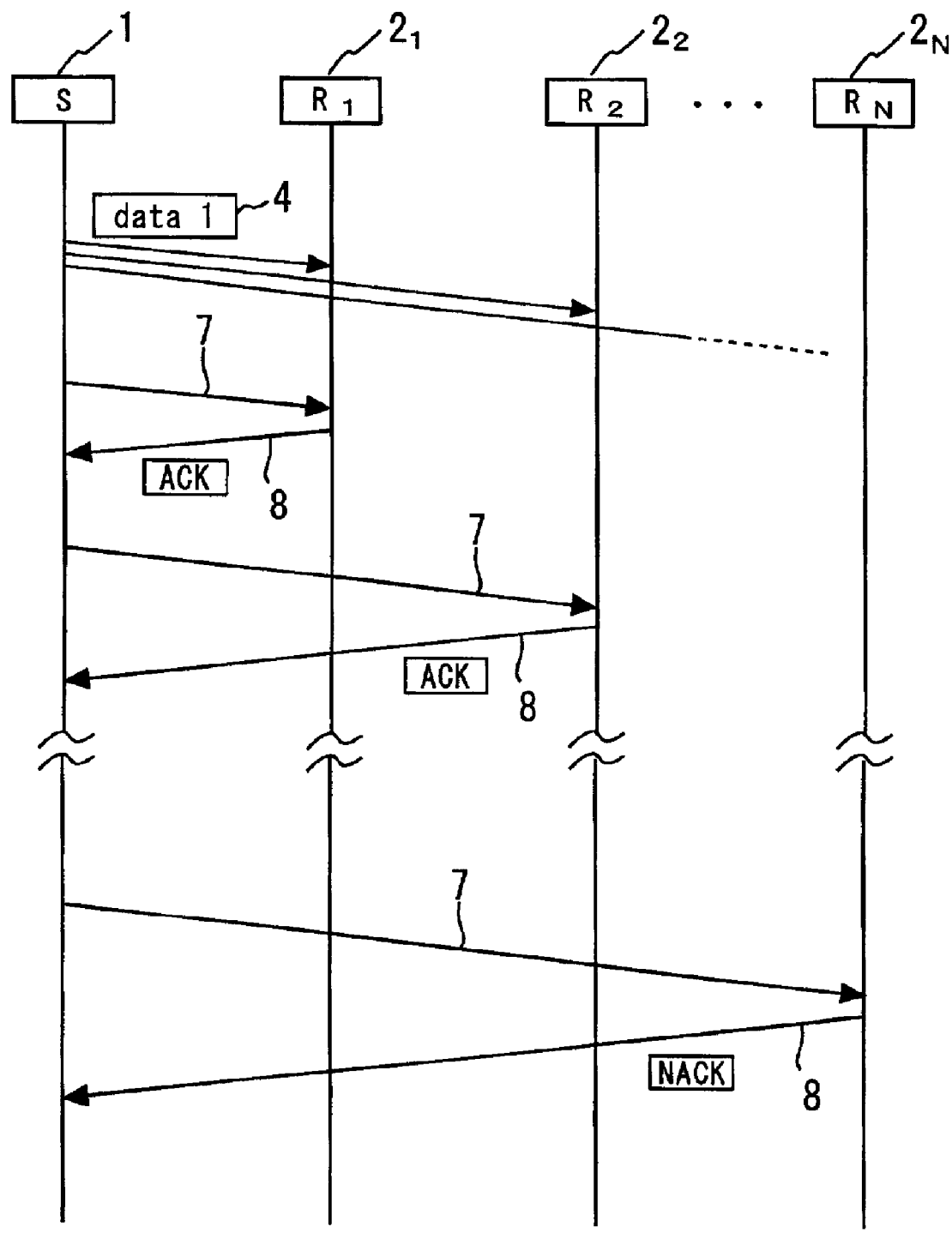
FIG. 4 is an illustration showing a processing sequence employed in a related-art satellite communications system.

The present method can be applied to a case where two information items are simultaneously distributed to individual receiver stations. FIG. 3 is an illustration showing a processing sequence employed in this case. The sender station 1 divides information X and information Y into a plurality of unit data sets X-1 through X-M and Y-1 through Y-M, and distributes the data sets alternately as illustrated. After having sent M unit data sets X-1 through X-M and Y-1 through Y-M, the sender station 1 sends a verification signal 5 to itself. Here, the verification signal 5 is a time division signal, wherein a verification signal for checking a result of distribution of the X data 4 and a verification signal for checking a result of distribution of the Y data 4 are assigned alternately to 2M time slots. The illustration shows that the receiver station 2 has failed to receive the second unit data (Y-2) pertaining to a movie Y and sends a jamming signal 6 in connection with a time slot corresponding to the unit data (Y-2). The sender station 1 records that the verification signal 5 corresponding to the unit data set (Y-2) could not be received and re-transmits the unit data set (Y-2) after checking operation.

As mentioned above, the present method is suitable for distributing a plurality of information items in parallel. Hence, there can be provided a service for distributing a movie X and a movie Y in parallel to a hotel in which a plurality of receivers are disposed.

The present invention can be applied to embodiments other than the above-described two embodiments. For instance, in the previous embodiments, unit data sets are differentiated from each other by means of ordinal numbers. However, unit data sets can be differentiated from each other by use of symbols or other identifiers. Further, in the previous embodiments, ordinal numbers assigned to unsuccessfully distributed unit data sets are temporarily recorded, and the distributed unit data sets are re-transmitted later as a single data set. However, immediately after a distribution failure has been verified, a corresponding unit data set may be re-transmitted. Moreover, the previous embodiments relate to a method of verifying results of distribution effected by the satellite communications system. Needless to say, the method according to the present invention is not limited to a satellite communications system but may be applied to any kind of system which distributes information by means of radio waves.

What is claimed is:

1. A method of verifying a result of distribution of information, comprising the steps of:
    transmitting, from a sender station to a receiver station, information to be distributed while the information is divided into a plurality of unit data sets;
    transmitting a plurality of verification signals corresponding to the respective unit data sets from the sender station to itself and receiving the verification signals at the sender station;
    transmitting, from the receiver station to the sender station, a jamming signal in synchronism with a verification signal corresponding to an unsuccessfully received data set, for hindering the sender station from receiving the distribution verification signal; and
    verifying occurrence of unsuccessful distribution of a unit data set corresponding to the verifying signal, from occurrence of a failure of the sender station to receive the verification signal transmitted to itself due to the jamming signal sent from the receiver station.

2. The method of verifying a distribution result according to claim 1, wherein the plurality of verification signals are time division signals allocated to time slots which are equal in number to the unit data sets.

3. The method of verifying a distribution result according to claim 1, wherein the verification signal includes an ordinal number assigned to a unit data set corresponding to the verification signal.

4. A sender station which verifies a result of distribution after distribution of information to a receiver station, comprising:
    an information distribution device configured to transmit the information while the information is divided into a plurality of unit data sets, at the time of distribution of the information to the receiver station;
    a verification signal transmission device configured to transmit, to the sender station itself, a plurality of verification signals corresponding to the unit data sets;
    a verification signal receipt device configured to receive a verification signal transmitted by the verification signal transmission device; and
    a distribution result determination device configured to determine that, when a jamming signal transmitted from the receiver station hinders the verification signal receipt device from receiving a verification signal, distribution of a unit data set corresponding to the verification signal has failed.

5. A system for verifying a result of a distribution of information, comprising: a sender station and a receiver station,
    wherein said sender station includes,
    an information distribution device configured to transmit the information while the information is divided into a plurality of unit data sets, at the time of distribution of the information to the receiver station,
    a verification signal transmission device configured to transmit, to the sender station itself, a plurality of verification signals corresponding to the unit data sets,
    a verification signal receipt device configured to receive a verification signal transmitted by the verification signal transmission device, and
    a distribution result determination device configured to determine that, when a jamming signal transmitted from the receiver station hinders the verification signal receipt device from receiving a verification signal, distribution of a unit data set corresponding to the verification signal has failed, and wherein said receiver station includes,
    a distributed information receipt device configured to receive the information which has been transmitted from the sender station while being divided into a plurality of data sets, and
    a jamming signal transmission device configured to transmit a jamming signal for hindering the sender station from receiving the verification signal, in synchronism with a verification signal corresponding to a unit data set unsuccessfully received by the distributed information receive device from among the plurality of verification signals transmitted by the sender station.

* * * * *